United States Patent [19]

Holland

[11] 4,104,680
[45] Aug. 1, 1978

[54] METHOD AND APPARATUS FOR FILM WEAVE CORRECTION

[75] Inventor: David E. Holland, Sepulveda, Calif.

[73] Assignee: Ellanin Investments, Ltd., Canada

[21] Appl. No.: 761,710

[22] Filed: Jan. 24, 1977

[51] Int. Cl.$^2$ .......................... H04N 3/36; H04N 5/86
[52] U.S. Cl. .................................... 358/132; 358/214; 358/216
[58] Field of Search ................. 358/54, 130, 131, 132, 358/214, 215, 216

[56] References Cited

U.S. PATENT DOCUMENTS

| 3,234,326 | 2/1966 | Goldmark et al. | 352/132 |
| 3,780,222 | 12/1973 | Pickstock et al. | 358/214 |
| 3,856,987 | 12/1974 | McMann et al. | 358/132 X |

*Primary Examiner*—Robert L. Richardson
*Attorney, Agent, or Firm*—Phillips, Moore, Weissenberger, Lempio & Majestic

[57] ABSTRACT

A method and apparatus for film weave correction is disclosed in connection with a moving beam-type recorder or flying spot scanner device having a continuous-motion film drive in which the film is edge-guided rather than sprocket hole-guided as during playback. The film weave correction apparatus causes the beam to sweep, at least once for each frame being scanned, horizontally across a sprocket hole defined in the film adjacent to the frame. A detector behind the film detects the beams's crossing of the sprocket hole edge. The apparatus compares the time of occurrence of this edge crossing with a reference time and generates therefrom a film weave correction signal. This signal is applied to the horizontal deflection circuitry of the device and causes the beam to be shifted in such a way that the horizontal position of each scanned frame remains constant with respect to the position of the adjacent sprocket hole rather than with respect to the film edge or film guide.

14 Claims, 8 Drawing Figures

FIG_3

FIG_6A

FIG_6B

FIG_6C

METHOD AND APPARATUS FOR FILM WEAVE CORRECTION

BACKGROUND OF THE INVENTION

Beam recorders and flying spot scanners having continuous motion film drives are generally used either for recording television images on motion picture film in the case of a recorder, or for reading out an image, in the case of a flying spot scanner. Each frame of the film is scanned in a line-by-line fashion by means of an electron beam, light beam, or laser beam, which is caused to sweep horizontally across the film as it moves through the film guide. Vertical positioning of the beam is provided mainly by the motion of the film itself as it passes through the scanning area of the film guide at a constant velocity. A continuous-motion film drive is needed when (as in real-time recording) there is insufficient vertical blanking time to allow pull-down of the film between frames.

The difficulty with continuous motion film drives derives from the fact that the film is edge guided during recording or readout. In the case where the film was recorded with such a device, for example, when the film is subsequently developed and printed, a pin registered movement is used. The pin registered movement uses the sprocket holes rather than the edge of the film to position the recorded frames. It has been found that the edge of the film has a tendency to vary in its distance with respect to adjacent sprocket holes, due to manufacturing tolerances in the making of the film. Therefore, when viewing the resultant film, the picture seems to horizontally shift position, i.e. weave, in a random manner. A similar effect is seen if the film was initially recorded using a pin registered movement, and a scanner having a continuous motion film drive is used to reproduce the film images.

An earlier attempted solution to this weaving problem generated in continuous motion film drive scanners was to add a sprocket drive to the continuous motion film drive. Such a drive was added at the point where the picture was scanned, to provide correct horizontal positioning of the film sprocket holes with respect to the beam. However, this method introduced small but abrupt speed changes as the sprocket tines entered the sprocket holes. This caused random lines of the television picture to separate during recording, which in turn caused unacceptable random horizontal black lines in the resultant recorded picture.

A second solution was to mechanically measure the position of the sprocket holes during the recording or reading of images on the film, and to use this position measurement to adjust the horizontal deflection of the beam. This method has been attempted, but without much success.

SUMMARY OF THE INVENTION

In accordance with the present invention, the beam normally used for scanning successive lines of image information on a film is caused to be horizontally shifted in position (e.g. during the blanking interval between frames) in such a way that the beam enters a sprocket hole during one or more sweeps. An antenna, photocell, or other appropriate sensor or detector is mounted behind the sprocket hole so as to detect the beam's crossing of the sprocket hole edge. The time interval between the detected edge crossing and a predetermined reference time keyed to the position of the recorded image is used to generate a position correction signal. This position correction signal is then used to properly position the next image to be recorded, by appropriately adjusting the horizontal deflection circuitry.

In the preferred embodiment, a plurality of horizontal measurement sweeps are made. During each sweep, the amplified and squared edge crossing signal is gated with a horizontal reference pulse, representing the predetermined reference time described above, such that an output pulse is generated whose pulse width is equal to the difference between the time of detection of the sprocket hole edge crossing and the time of receipt of the horizontal reference pulse. The output pulses are integrated by an integrator such that a DC signal is produced whose amplitude represents the average of the pulse widths of the plurality of output pulses. The output of this integrator is sampled and held to enable the DC signal to be retained until measurement of the next sprocket hole is performed. The DC signal is coupled to the horizontal deflection amplifier as a weave correction signal which adjusts the centering of the next frame to be scanned on the film to compensate for any detected positional error between the image position as normally defined by the film edge and the position of the adjacent sprocket holes. It will be noted that this arrangement compensates both for misalignment between the film edge and the sprocket holes, and for any electronic drift in the horizontal image positioning circuitry.

Thus, a principal object of the present invention is to provide a simple, non-mechanical method and means for film weave correction in a continuous-motion film drive.

Another object of the present invention is to provide a film weave correction circuit wherein the edge position of each sprocket hole along one side of the film is measured at least once per frame to enable virtually continuous updating of the film weave correction signal.

A further object of the present invention is to provide a film weave correction circuit wherein a plurality of edge position measurements are made for each sprocket hole, with the weave correction signal being derived as a function of the average of these measurements.

These and other objects and advantages of the present invention will become more clear upon reference to the accompanying drawings and the following description.

DESCRIPTION OF THE PREFERRED EMBODIMENT

The present invention relates to a method and means for film weave correction in a continuous-motion film drive beam scanning device. Such a device can be used in a film recorder that records data on film, or in a flying spot scanner that reads out image information previously recorded on a film. That is, beam scanning is defined to be the motion of the beam during film recording or film readout. Since the weave correction apparatus of the present invention is equally applicable to either type of scanner, the detailed description given hereinbelow will be confined to just one of the two types, the beam recorder film scanner.

Figures 1, 2:
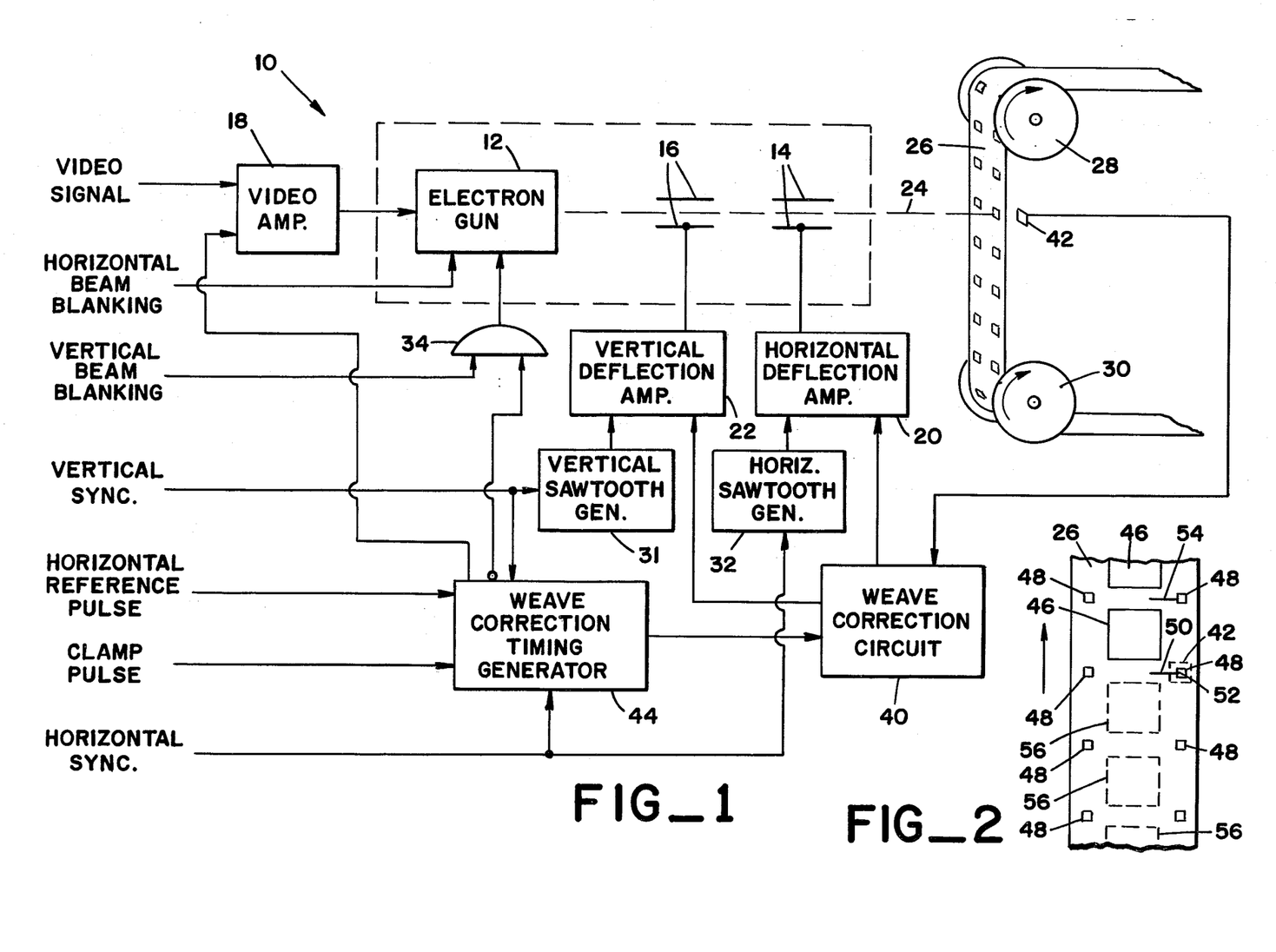
FIG. 1 is a block diagram of relevant portions of a beam-type scanner, including a preferred weave correction circuit in accordance with the present invention.
FIG. 2 is a detailed frontal view of film orientation with respect to the beam detecting device of the current invention.

FIG. 1 illustrates in block diagram form a conventional electron beam recording device 10 consisting of an electron gun 12; a beam scanning means including appropriate horizontal deflection means 14 and vertical deflection means 16; a film transport mechanism; and a video amplifier 18 for modulating the electron gun 12 as a function of an input video signal. The horizontal deflection means 14 are controlled by a horizontal deflection amplifier 20, and the vertical deflection means 16 are controlled by a vertical deflection amplifier 22. The electron gun 12 and deflection means 14 and 16 generate and steer an electron beam 24. An electron-sensitive motion picture film 26 is continuously moved at a constant velocity past the beam aperture or recording area by a conventional continuous-motion film transport mechanism, schematically illustrated as follers 28 and 30. The film 26 is edge guided, i.e. positioned in the recording area as a function of the film's edge. The electron beam 24 records successive lines of the image by repetitively scanning across the film 26. An example of an electron beam recorder usable with the present invention is the Color EBR Model C72 manufactured by 3M Company.

The production of motion picture film from a video signal input is normally performed in a beam recorder, such as an electron beam recorder, by first taking the video signal, and separating from this signal in a conventional manner the image content information and the scan control signals needed to produce the image. These signals include the vertical sync signal, the horizontal sync signal, and the vertical and horizontal beam blanking pulses required during blanking intervals, e.g. during beam retrace.

As shown in FIG. 1, the vertical sync signal is applied to a vertical sawtooth generator 31 and the horizontal sync signal is applied to the horizontal sawtooth generator 32. The vertical sawtooth generator 31 output is applied to the input of vertical deflection amplifier 22. The horizontal sawtooth generator 32 output is applied to the input of horizontal deflection amplifier 20. Also as shown, vertical beam blanking is applied to the electron gun 12 as a function of beam blanking pulses coupled through an AND gate 34. During normal operation, beam blanking pulses cause the electron gun 12 to turn off during both the horizontal and the vertical retrace of the electron beam. As will be described further hereinbelow, the present invention negates the vertical blanking pulse, by means of AND gate 34, to enable the beam to be used for other tasks during this interval.

Accordingly, to eliminate the film weaving problem caused by variations in the position of the film edge with respect to the film sprocket holes, the present invention provides a method and means for controlling the position of the beam 24 such that all frames recorded on the film are positioned with respect to the detected position of the sprocket holes, and not with respect to the film edge. Specifically, during at least one horizontal sweep of the beam 24, the beam is shifted such that the beam 24 crosses the edge of a sprocket hole adjacent to the frame to be recorded. A beam detector 42, comprising an antenna when an electron beam is being detected, detects the beam 24 as the beam crosses the sprocket hole edge, and couples this signal to a weave correction circuit 40. The weave correction circuit 40 compares the time of occurrence of the beam 24 edge crossing with a horizontal reference pulse, and generates a correction signal in response thereto. This signal is a weave correction signal, in that it is a DC level that directly represents the present positional difference between the edge of the frame and the sprocket hole. This correction signal is then applied to the horizontal deflection amplifier 20, enabling corrective shifting of the electron beam 24 in response thereto. Thus, the resultant film data frames are positioned during recording with respect to their adjacent sprocket holes and not the film edge. A separate weave correction timing generator 44 may also be provided for conventional production of timing signals used by the weave correction circuit 40.

FIG. 2 illustrates a detailed frontal view of the film 26 orientation with respect to the antenna 42 of the present invention. Shown in the film segment is a representation of a plurality of recorded frames of data 46, a plurality of sprocket holes 48, and beam tracks 50, 54 which are produced by the electron beam 24 as it crosses the given sprocket hole 48 edge being measured. The sprocket hole edge currently being measured is shown at 52. In the present embodiment, each sprocket hole edge is measured before the next adjacent frame is recorded on the film 26. Since the film 26 is represented as moving in an upward direction, the next adjacent frame to be recorded, and sprocket hole 48 to be measured, are in a position below the previous frames and sprocket holes.

Thus, a beam track 54 was formed during measurement of the sprocket hole edge previous to edge 52. The resultant weave correction signal generated thereby by the apparatus of the present invention was used to horizontally position the last recorded frame 46 on the film 26. Frame 56 is shown dotted because an image has not yet been recorded in that film section. Note that FIG. 2 shows the beam 24 as being horizontally shifted to the right beyond the frame to be recorded, so that it extends across the sprocket hole during the edge measurement sweeps. Alternatively, the beam 24 could be initially calibrated to normally sweep horizontally beyond the frame being recorded, so that no additional shifting is required to have the beam 24 cross adjacent sprocket hole edges. In such an embodiment, the beam would be blanked beyond the edge of the frame during normal recording.

The present embodiment provides for eight separate horizontal sweeps of the beam 24 across a given sprocket hole edge 52. During each sweep, the edge 52 is measured. These measurements are used to generate the weave correction signal as will be described in more detail hereinbelow. In the time during which the last three scans, or horizontal sweeps, can be performed, the weave correction circuit 40 generates the weave correction signal. This time interval also enables checking of the operation of the weave correction circuit 40 during initial calibration of this circuit. Details of this are given below. Although the position of each sprocket hole can be measured at any time during which the sprocket hole is in the beam 24 recording area, for convenience the present embodiment provides for making this measurement during the first eight horizontal scans of a given frame. Thus, as can be seen in FIG. 2, the last recorded frame was the frame 46 above and adjacent to the sprocket hole 48 presently oriented with respect to the antenna 42. Once the horizontal edge scans as described have been completed, the beam 24 begins to scan the next frame 56 below the just measured sprocket hole.

Figure 3:
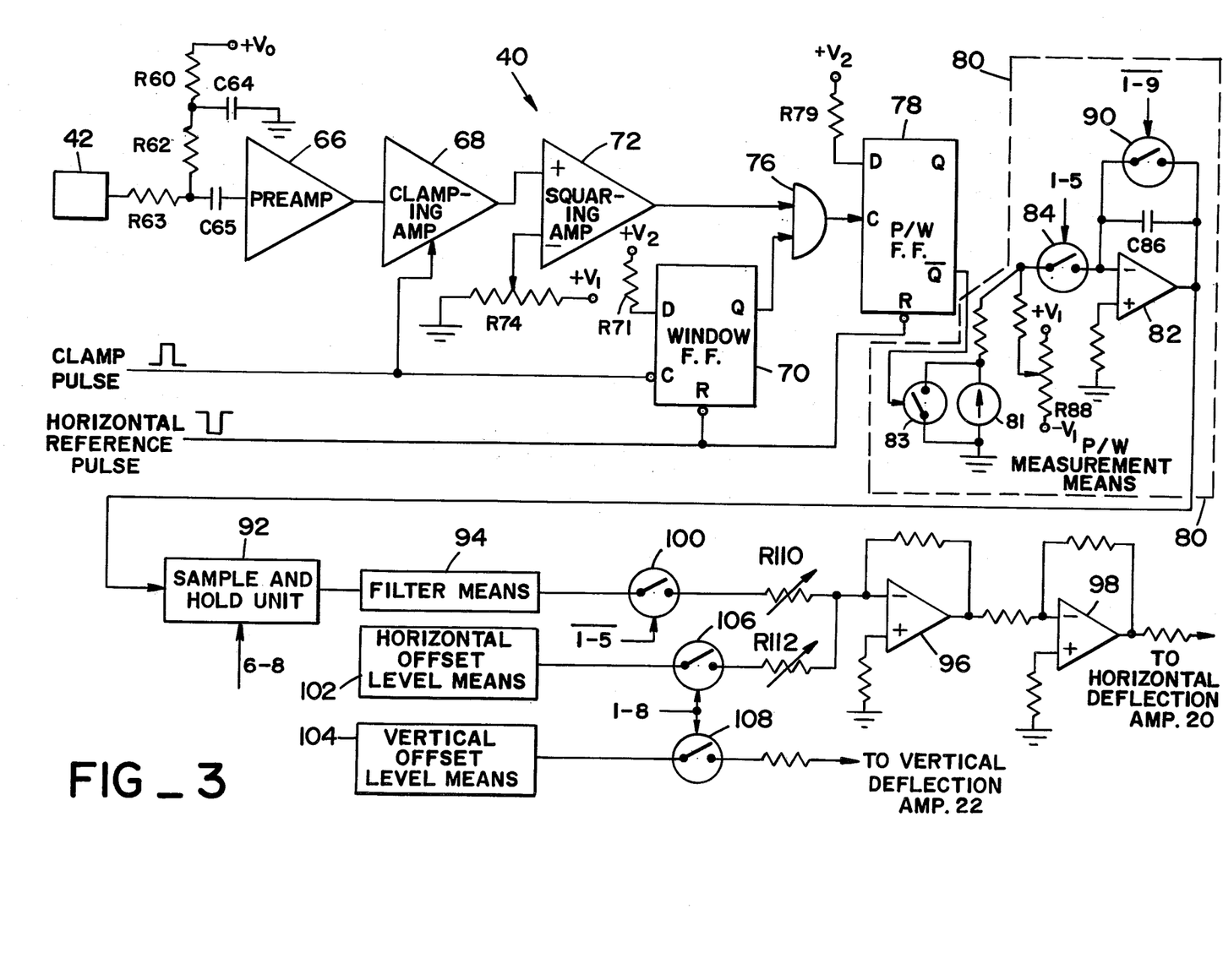
FIG. 3 is a combined schematic and block diagram of the weave correction circuit shown in FIG. 1.

FIG. 3 is a combined schematic and block diagram of the weave correction circuit 40 shown in FIG. 1. As seen in FIG. 3, in the present embodiment an antenna 42 is used to detect an electron beam 24. Electronically, it is at the input to the weave correction circuit. Antenna 42 is composed of a small square of metal which is biased by a voltage $V_0$ and resistors R60, R62, and R63 such that the antenna is biased to draw in the electron beam 24, thus facilitating beam 24 detection by the circuit 40. The capacitor C64 provides filtering to keep any power supply noise from affecting the antenna. The antenna is essentially just a metal plate which charges negatively when the beam 24 is incident thereon. This generates a voltage change which is detected by a preamplifier 66. Capacitor C65 prevents the bias voltage $V_0$ from entering the preamplifier 66. In the present embodiment, R60 is 3 megohms, R62 is 2 megohms, R63 is 220 ohms, and $V_0$ is 150 volts.

Figure 6A:
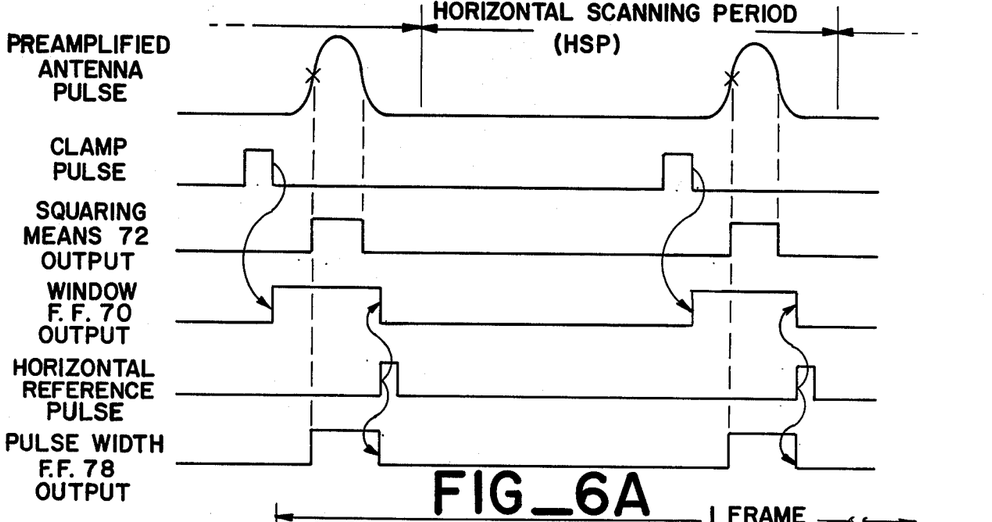
FIGS. 6A–6C are time-amplitude diagrams illustrating the waveforms appearing at various points in the circuitry of FIG. 3.

The preamplifier 66 takes the antenna signal and amplifies it such that a pulse of between 2 and 3 volts is outputted from the preamplifier whenever the beam 24 is detected by the antenna 42. The first waveform in FIG. 6A illustrates preamplified antenna pulses resultant from two detected beam 24 sprocket hole edge crossings. Note that in the present embodiment the horizontal scanning period (HSP) is approximately 30 $\mu$s, i.e. each horizontal sweep of the beam 24 takes about 30 $\mu$s to be completed.

Means are provided for ensuring that no spurious pulses are detected and analyzed by the weave correction circuit 40. This means causes the circuit 40 to ignore any pulses that do not occur within a defined interval of time during each horizontal sweep of the electron beam 24. To provide this function, the present invention generates a window pulse. A clamp pulse is used to initiate the window. A second function of the clamp pulse is described infra. The clamp pulse can provide a means for indicating when the expected edge crossing is about to occur, since the recorder enables such pulses to be selectively generated at a given specific time during each beam sweep. Thus, during precalibration of the weave correction circuit 40, one merely adjusts the occurrence of this clamp pulse such that it is generated just before the worst case shifted sprocket hole edge is expected to be detected by antenna 42 during a given horizontal beam 24 sweep. It should also occur sufficiently before retrace, to give the antenna pulse sufficient operating range. This precalibration can be performed simply by adjusting the horizontal position of the beam 24 with respect to the beam recording area. Once the clamp pulse has been precalibrated, no recalibration should be necessary. Note that one could also use a phase locked loop to keep track of edge crossing occurrences with respect to beam sweep position, and use this as the reference for setting up the clamp pulse.

FIG. 6A illustrates the normal timing position of the clamp pulse with respect to the detected beam edge crossing pulse generated by the preamplifier 66. As seen in FIG. 3, the trailing edge of the clamp pulse turns on a window flip-flop 70. This initiates the window period, the period of time during which antenna pulses will be accepted by the weave correction circuit 40. The window flip-flop 70 is a standard D type edge triggered flip-flop.

As mentioned above, the clamp pulse also has a second function. The output of preamplifier 66 tends to drift slowly in its DC level output, so that identical antenna pulses outputtted therefrom were not always analyzed equally by subsequent circuitry in the circuit 40. In the preferred embodiment, the clamp pulse enables base line zeroing of preamplifier 66. That is, the output of preamplifier 66 is DC restored just prior to the occurrence, of the next antenna pulse. Referring to FIG. 3, the clamp pulse is shown to be inputted to a clamping amplifier 68. While the clamp pulse is asserted, this amplifier 68 acts to DC restore the output of preamplifier 66, such that the antenna pulse is always referenced from a constant DC level, to enable consistent analysis of identical antenna pulses by the circuit 40.

Preamplified antenna pulses are blocked from being analyzed unless they occur during the desired window period, as described above. The DC-restored antenna pulse, squared by squaring means 72, is logically AND'ed with the output of the window flip-flop 70, such that an output is detected only during the time that the window flip-flop is turned on. This AND function is provided by gate 76. In the present embodiment, the squaring means 72 comprises a conventional comparator and a resistor R74. Resistor R74 enables setting of the threshold magnitude which must be exceeded by an input signal before the comparator will generate a squared output pulse in response thereto. Reference is again suggested to FIG. 6A wherein the squaring means output is illustrated as a function of the exemplified preamplified antenna pulses shown therewith.

The output of AND gate 76 is coupled to a pulse width (P/W) flip-flop 78. This flip-flop is caused to turn on by the leading edge of any antenna pulse that has been enabled to be passed through the gate 76. More about the functioning of flip-flop 78 is given below, but first a few further details concerning the operation of this flip-flop and also flip-flop 70 is needed. Both the window flip-flop 70 and the pulse width flip-flop 78 are edge triggered by pulses appearing at their clock inputs, and are caused thereby to turn on. This is because the D, or data, inputs to these flip-flops are both tied through respective resistors R71 and R79 to a positive voltage source $V_2$ of approximately 5 volts. The only means available, therefore for resetting these flip-flops 70 and 78, is via their reset inputs. In the present invention, a horizontal reference pulse is generated by the electron beam recorder, in a manner similar to its generation of a clamp pulse, and is used to perform this resetting function. This reference pulse is set to occur only after the beam 24 has entered the hole 48 during each measurement sweep.

Thus, the horizontal reference pulse provides two functions. First, since it resets the window flip-flop 70, it acts as the means by which the window is turned off so that no further pulses from the antenna are allowed through gate 76 after this time. As a result, only after the next clamp pulse is detected by the weave correction circuit 40, is the window re-opened. Secondly, the horizontal reference pulse acts to reset the pulse width flip-flop 78. The output of this flip-flop 78, therefore, is a pulse having a pulse width that is representative of the time difference between the detected time of the beam 24 sprocket hole edge crossing, and the time of receipt of the horizontal reference pulse.

An exemplary horizontal reference pulse is shown in FIG. 6A. As can be seen, the leading edge of this pulse causes both the output of the window flip-flop 70 and the output of the pulse width flip-flop 78 to be reset. Note that the horizontal reference pulse is generated and precalibrated in a way that is again similar to the clamp pulse. Initially, a timing point is chosen for the generation of the horizontal reference pulse which will correspond to a time when the electron beam 24 has already scanned past the furthest expected position of the sprocket hole 48 edge being measured. In the present invention, the horizontal reference pulse is generated just before horizontal beam retrace is performed.

The weave correction circuit 40 next includes pulse width measurement means 80 for converting the pulse width of pulses outputted by flip-flop 78 into a DC level. The magnitude of this level is in essence the weave correction signal, which when applied to the horizontal deflection amplifier 20, causes the horizontal position of the electron beam 24 to be adjusted thereby. As mentioned above, the present invention makes a plurality of electron beam 24 sweeps across each measured sprocket hole 48 edge. Although more than one edge crossing beam 24 sweep is not essential, the performance of a plurality of such edge measurements simply provides a more accurate ultimate value for the sprocket hole 48 edge position. Therefore, the pulse width measurement means 80 comprises means for averaging the various pulse widths obtained by the plurality of beam 24 sweeps performed across each sprocket hole edge, i.e. means for averaging the time differences found between the beam 24 edge crossings and the associated horizontal reference pulse. Thus, the pulse measurement means 80 generates a correction signal, i.e. a DC level, which is a function of this pulse width averaging.

Figure 6B:
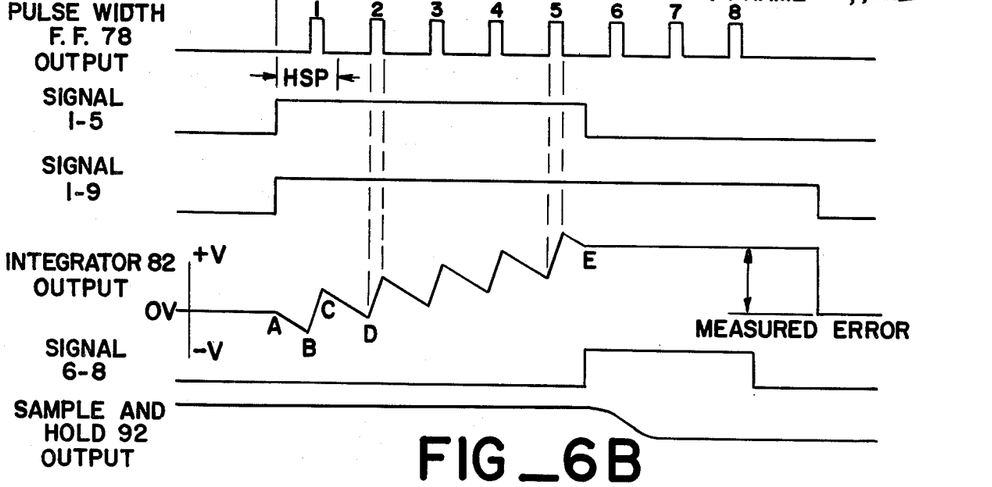

The preferred embodiment of the present invention provides for the analysis of measurements generated from 5 sweeps of the beam 24 acros each sprocket hole 48 edge (e.g. edge 52 shown in FIG. 2), with five separate pulses resulting therefrom. Thus, the pulse width measurement means 80 averages the pulse widths of these five separate pulses as outputted from the pulse width flip-flop 78. FIG. 6B illustrates the operation of the pulse width measurements means 80 on these output pulses. Recall that the pulse width of each pulse outputted from the pulse width flip-flop 78 represents the time difference detected between the beam 24 edge crossing and the occurrence of a horizontal reference pulse. These pulse widths may or may not be exactly equal. Also flip-flop 78 is shown to have eight output pulses. This is because although the pulse width of five pulses are averaged, eight sweeps of each sprocket hole 48 edge are performed by the electron beam 24. The three pulses generated during the last three beam 24 sweeps are ignored. However, these last three sweeps provide a time delay needed partly by the circuit 40 to complete the analysis of the five averaged pulses, to thereby generate a weave correction signal, and also to enable checking of circuit operation to verify by oscilloscope that proper beam correction was in fact performed.

Note that the time reference for the pulses shown in FIG. 6B is compressed with respect to the time reference of FIG. 6A. Thus, the horizontal scanning period (HSP) shown in FIG. 6A is shown in FIG. 6B as a much shorter graphical distance. This time reference difference is provided merely to make the various waveforms more understandable. In other words, FIG. 6B illustrates all eight output pulses from the pulse width flip-flop 78, as these pulses are generated by the eight horizontal scans of the electron beam 24 across the sprocket hole 48 edge. FIG. 6A, illustrating a shorter time duration, only shows two of these pulses.

Figure 4:
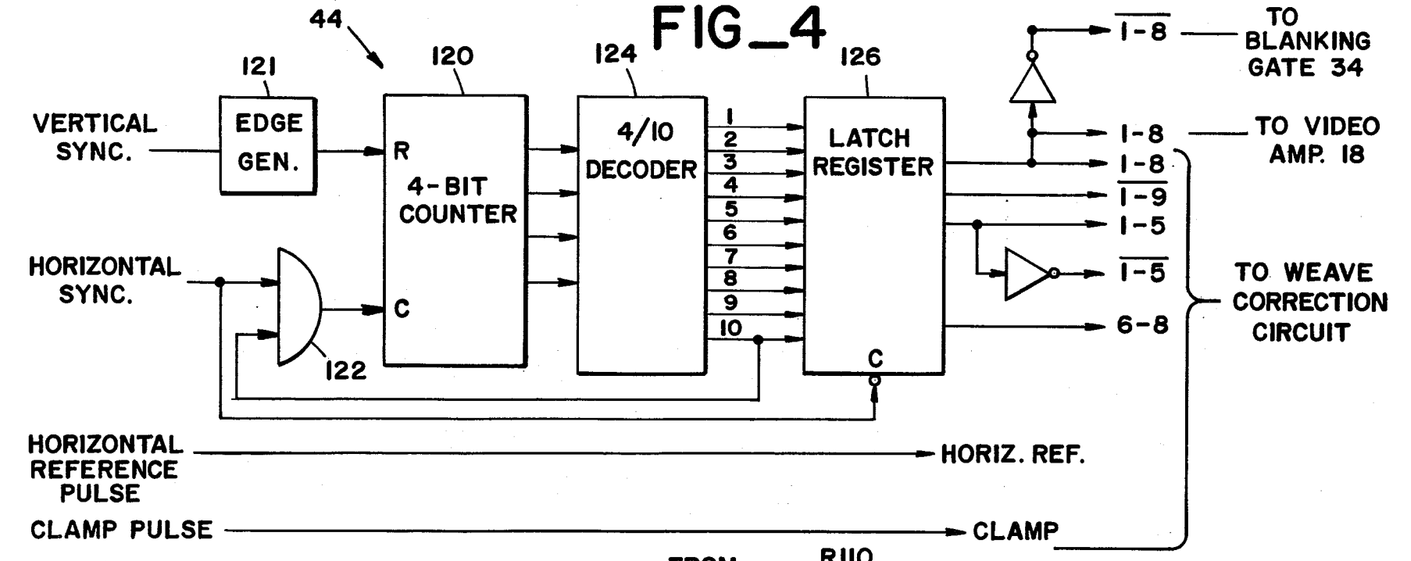
FIG. 4 is a detail of the weave correction timing generator shown in FIG. 1.

The pulse width measurement means 80 essentially comprises a high slew rate operational amplifier 82 biased to be a current integrator. The output of flip-flop 78 enables a current source 81 to be coupled to amplifier 82 only when a pulse is present. At all other times an analog switch 83, under flip-flop 78 control, shorts out this current source 81. Means 80 also integrates signals inputted to it only during the duration of the first 5 pulses outputted by flip-flop 78. The integrator 82 is enabled to see only the first 5 pulses by means of a conventional analog switch 84. These analog switches are MOS analog switches, such as the AH0015 switch made by National Semiconductor. These switches allow a TTL compatible logic pulse to operatively turn on or turn off the analog switch at a fast switching speed of up to 500 nanoseconds per switch. The switch when "open", causes a resistance of $10^{11}$ ohms to be seen, and when closed only 200 ohms. Therefore, the analog switch 84 provides a simple means for allowing only the first 5 pulses during the measurement of each sprocket hole to be inputted to the integrator. A timing pulse for operating this switch 84 is shown in FIG. 6B as signal 1-5. This timing signal 1-5 is within the skill of the art, since a simple counter and latching register can be used to generate such timing signals as a function of the horizontal and vertical sync pulses. An exemplary circuit for this weave correction timing generation is shown in FIG. 4 and will be discussed further infra.

The integrator 82 is conventionally hooked up with a capacitor C86 in the amplifier 82 feedback path. Further, to keep the output of the integrator 82 within operational limits, an offset signal is additively applied to the integrator 82 along with the current source 81 output controlled by the pulse width flip-flop 78. The offset signal is generated by a variable resistor R88 preset such that this signal constitutes a fixed current level. This level is adjusted such that the output of the operational amplifier 82 does not exceed its operational range during normal integration of the five measured pulses.

A second analog switch 90 is added in parallel with capacitor C86. This analog switch functions to zero the integrator 82 at all times except when the integrator 82 is integrating the pulses from the pulse width flip-flop 78 and when the integrator 82 is being read out after completion of the integration of the pulses.

As is seen in FIG. 6B, a timing pulse, signal 1-9, opens analog switch 90 for the duration of the time period from the first horizontal scan sweep to the end of the eighth sweep. Also illustrated in FIG. 6B is the integration process of the integrator 82 as seen at its output. Before analog switch 90 is caused to be opened, i.e. before the first pulse width flip-flop 78 pulse appears, the integrator 82 output is held at 0 volts. When switch 90 opens and switch 84 closes, in response to the occurrence of signals 1-9 and 1-5 respectively, the integration begins. Initially, at point A, since no pulse is coupled to the integrator at this time, only the offset signal which is a negative signal is integrated. At point B, the pulse integration begins. Since the pulse is a positive voltage that exceeds the offset voltage level, the slope of the integration reverses during the duration of the pulse width of this pulse. At point C, the pulse ends, and thereafter till the next pulse is seen at point D, only the offset signal is integrated. After all five pulses have been integrated, the integration ends at point E with the re-opening of switch 84 in response to signal 1–5 going off. Note that the relative input current of the pulses must be greater than the offset signal current, such that the slope of integration is higher when pulses are occurring, since the pulse integration must not only counteract the offset signal when the pulse is present (because the offset signal is continuous), but also because the pulse width duration of each of the five pulses is shorter than the expected time duration between pulses.

Once the five pulses from the pulse width flip-flop 78 have been integrated by the integrator 82 of the pulse width measurement means 80, the output of the means 80 is a DC signal i.e. a level that is a direct function of the pulse width duration of the five integrated pulses. Essentially, the level indicates the average pulse width of the five pulses generated by the pulse width flip-flop 78. Note that the range of the output from operational amplifier 82, and thus the means 80, is from +10 to −10 volts. Therefore, to initialize this circuit, the offset resistor R88 is calibrated so that when a sprocket hole 48 edge is occurring approximately in the middle of its position varying range, the output of integrator 82 is at zero volts. Similarly, when the edge is at one or the other expected positional extremes of its range, the output of the operational amplifier is either at +10 volts or −10 volts depending on which side of the edge midposition the position variation is occurring.

To retain the DC level as a correction signal for the electron beam 24 during the duration of the entire next frame of data recorded on the film 26, means must be provided to store and continuously output this level so that it will act as a weave correction signal for the beam 24 horizontal deflection. In the present embodiment, a standard sample and hold unit 92 is provided to perform this function. Such units sample their input at a given time under the control of a sample pulse command and, until a new sample pulse is detected, continually output this detected level.

In the present embodiment of the invention, the sample pulse, i.e. the pulse used to control when the unit 92 output is updated, is set to occur during the time period from the sixth through the eight pulses generated by the pulse width flip-flop 78, i.e. during the time of the sixth through the eighth horizontal sweep of the electron beam 24 through the given sprocket hole 48 being measured. The sample and hold unit 92 is therefore updated with the new DC level, generated by measurement means 80, during this time. This level is then coupled from unit 92, as described below, to the beam 24 horizontal deflection amplifier 20. Consequently, during the recording of the entire next frame, the sample and hold unit 92 output comprises the current film weave correction signal. The changing of the DC level output of the sample and hold unit as a function of signal 6–8 is illustrated in FIG. 6B. Note that the new sample and hold unit 92 output level corresponds to the DC level output of the integrator 82 identified as the "measured error" in FIG. 6B.

Figure 6C:
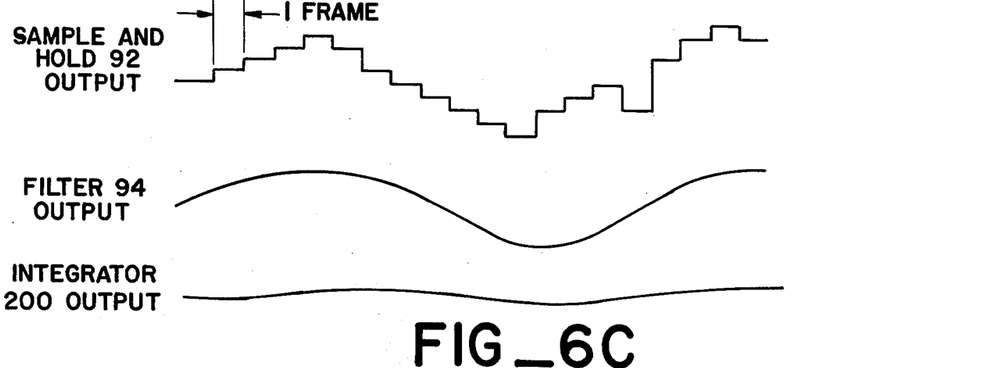

FIG. 6C shows exemplary variations in the output of the sample and hold unit 92 over a plurality of frames of data. As such, this representation is a much condensed version with respect to time of the sample and hold 92 output signals illustrated in FIG. 6B. This is because FIG. 6B illustrates eight horizontal scans of the beam 24 whereas FIG. 6C illustrates a plurality of frames, with each frame containing many hundreds of horizontal scans by the beam 24. With regard to the sample and hold unit 92 output, it was found that since in standard video signals a frame occurs once every thirtieth of a second, a filtering means should be provided to smooth out any abrupt changes in the sample and hold unit output. The filter means 94 thus reduces the effect of any erroneous measurements that may have been made by the circuit 40. Erroneous measurements could occur due to motor noise generated by the EBR or from an external source. Such a filter means 94 is illustrated in FIG. 3. As seen in FIG. 6C, the output of filter 94 is a smooth curve representative of the output of the sample and hold unit 92.

Referring again to FIG. 3, the weave correction signal of unit 92 as outputted by filter 94 is coupled through a summing amplifier 96 and an output amplifier 98 before being coupled to the horizontal deflection amplifier 20. An analog switch 100 is also added in series between the filter 94 and the summing amplifier 96. Switch 100 is required to disconnect the weave correction signal during the time that the beam 24 is measuring the sprocket hole 48 edge. This is so that each new sprocket hole 48 measurement is unaffected by the correction signal generated by the previous weave correction measurement. For simplicity, FIG. 6 does not illustrate this weave correction signal disconnection. Note that the weave correction signal is allowed through analog gate 100 after the fifth pulse has been detected, i.e. after the five measurement sweeps have occurred. This is to enable initial calibration of R110 and to enable subsequent checking of the weave correction circuit 40, to see if proper beam 24 position correction has in fact been performed. Using an oscilloscope, as mentioned above, one can monitor the pulses generated by the pulse width flip-flop 78 during the sixth, seventh, and eighth sweep. Since the output of sample and hold unit 92 should reflect the new correction signal by the seventh sweep, the pulse width out of flip-flop 78 should be a constant known value during the seventh and eighth sweeps. If it varies as the film weaves, the gain of the circuit 40 is too high or too low. Variable resistor R110 is adjusted for minimum variation in the pulse width out of flip-flop 78 during the seventh and eighth sweeps. A weave error must exist to make this adjustment. An easy way to introduce such an error is by quickly adjusting beam horizontal centering back and forth.

Amplifier 96 is needed for two reasons. First, as mentioned above the weave correction signal is not coupled to the horizontal deflection amplifier 20 during sprocket hole 48 measurements. However, a horizontal offset DC level may be required to enable the beam 24 to be shifted out of its normal sweep path so that it will cross the sprocket hole 48 during the eight measurement sweeps of the hole 48 by the beam 24. Thus, the offset and weave correction signals are summed together via amplifier 96. Secondly, as mentioned above, amplifier 96 enables resistor R110 to adjust the amplification of this amplifier and thereby circuit 40 gain.

The horizontal offset is generated by offset means 102. This offset is coupled to the amplifier 96 via an analog switch 106 which conducts only during the 8 measurement sweeps. Recall that the weave correction signal is disconnected by analog switch 100 during most of this time. A vertical offset may also be required for enabling beam 24 to sweep across each sprocket hole 48. An offset means 104 generates such an offset. The output of the vertical offset level means 104, via an analog switch 108, is coupled directly to the vertical deflection amplifier 22. Analog switch 108 is turned on by the same signal 1-8 which actuates the horizontal offset analog gate 106. Both offset means 102 and 104 may be merely a potentiometer having two poles, connected one to +V and one connected to ground.

A unity gain output amplifier 98 is needed to invert the signal from amplifier 96. Also, the output of a second integrator, to be described below, must be added at the input to amplifier 98 instead of at the input to amplifier 96 to obtain the correct signal polarity. Note that both amplifiers 96 and 98 are biased in a conventional manner. Further, the variable resistor R112 is needed merely to enable variation in the level of the horizontal offset and to ensure proper matching of the two inputted signals to amplifier 96.

As mentioned above, FIG. 4 illustrates in detail an example of a weave correction timing generator 44. This generator 44 has the horizontal sync and vertical sync pulses inputted to it. The horizontal sync signal may for example be a 35 KHz signal, and the vertical sync signal may be a 72 Hz signal. The circuit is designed such that the 4-bit counter 120 is locked in a reset mode except during the time interval just after the vertical sync pulse has occurred. The leading edge of the vertical sync pulse is converted into an edge pulse by a conventional edge generator 121. This edge pulse is then coupled to counter 120 to reset it thereby. Note that the reset pulse could be timed to occur at any time after a vertical sync pulse has occurred. Thus, timing pulses are generated by the generator 44 in the present embodiment, during the vertical blanking interval. Consequently, the sprocket holes 48 are measured during this interval. Once the 4-bit counter 120 has been reset and thereby enabled to count up from zero, the horizontal sync pulse is enabled to be coupled via AND gate 122 to the clock input of the 4-bit counter 120. As a result, at this point the counter 120 begins to count up as a function of the horizontal sync pulses detected thereafter. As can be seen, the counter 120 counts the number of horizontal sweeps that the electron beam 24 takes through the sprocket hole 48 currently being measured.

The output of the 4-bit counter is inputted to a 4/10 decoder 124, such as a Texas Instruments SN7442 decoder, whose 10 outputs are enabled one at a time based on the present state of the counter 120. Thus, line 1 out of the decoder 124 is in a changed state with respect to all the other output lines 2-10 of the decoder when the counter 120 has been reset. When the counter has counted 1 count, line 2 has a changed state and line 1 and lines 3-10 are in the other state. Similarly, when the counter has counted 2 counts, the line 3 output of decoder 124 is in a changed state. A latch register 126 is provided to take these individual outputs and to generate output timing signals in response thereto. Such a register 126 is of a conventional design easily reproduceable by one skilled in the art. Note that the horizontal sync pulse also is the clock input for register 126. Thus, the outputs from register 126 reflect the current state of the 4-bit counter, and thus provided timing signals to the weave correction circuit 40. The register 126 outputs include a timing pulse having a duration beginning when the first count occurs and ending after the fifth count, signal 1-5, another one beginning on the first count and ending after the eighth count, signal 1-8, another one beginning on the first count and ending after the ninth count, signal 1-9, and another one beginning on the sixth count and ending after the eighth count, signal 6-8. All of these timing pulses are used by the weave correction circuit 40 as described above. Note that when the decoder 124 reaches the tenth count of the 4-bit counter, this state is fed back to the 4-bit counter via gate 122. This signal operates to negate any further horizontal sync pulses from passing through gate 122 to generate further counting by the 4-bit counter. As a result, until the counter 120 is reset by the leading edge of the next vertical sync pulse, the output of decoder 124 and thereby the output of latch register 126 is retained in this last tenth count position. Thus, the output timing pulses inputted to the weave correction circuit remain in their final proper state until the next sprocket hole edge measurement is required, indicated by the occurrence of the next vertical sync pulse.

As shown in both FIG. 4 and FIG. 1, outputs from the weave correction timing generator 44 are also connected to the video amplifier 18 and the blanking gate 34. Both these timing signals are of a duration such that they are actuated during the time that a sprocket hole 48 measurement is in progress, i.e. signal 1-8 and signal $\overline{1\text{-}8}$. Signal 1-8 is sent to the video amplifier to generate a white pulse in the video amplifier so that an electron beam 24 is outputted during the sprocket hole 48 edge measurement time even though there is no video signal present during vertical blanking. Signal $\overline{1\text{-}8}$ is inputted to gate 34 to counteract normal beam blanking during the vertical blanking interval, again so that the electron gun will operate during the sprocket hole 48 edge measurement time.

Therefore, in operation, the apparatus according to the present invention begins its operation when the vertical sync pulse causes the resetting of counter 120, to thereby begin the timing pulses required by the weave correction circuit 40. Signal 1-8 causes the horizontal offset level means 102 and vertical offset level means 104 to modify respectively the horizontal deflection of the electron beam 24 and the vertical deflection of the electron beam 24 to cause the beam to shift in sweep position such that it crosses the edge of a sprocket hole 48 on the film during each edge measurement sweep. At the same time, analog gate 100 is caused to open by signal 1-5 such that during the sprocket hole 48 edge measurement, the weave correction signal generated during the previous sprocket hole 46 edge measurement does not affect the horizontal deflection of the beam 24 during the present edge measurement. The beam 24 is detected by the antenna 42 as the beam 24 crosses the edge of the sprocket hole 48 being measured, and a pulse is generated thereby for each of the first five times that the beam 24 is caused to sweep across the sprocket hole 48. Integrator 82, integrates the pulses detected by the antenna 42 when analog switch 84 is closed, i.e. during this pulse generation time, as defined by signal 1-5. When signal 1-5 goes off, the integration is complete, with integrator 82 now having an output DC level representative of the pulse widths detected during the electron beam 24 measurement. This output level is then sampled by the sample and hold unit 92, by means of the timing pulse 6-8, such that the output of this unit 92 now reflects the new weave correction signal generated by the integrator 82. This weave correction signal is used by the beam 24 during the recording of the next frame of data, in that the output of the sample and hold unit 92 is coupled via analog switch 100 to the horizontal deflection amplifier 20. The horizontal and vertical offset levels are disconnected via analog switches 106 and 108 at the end of the eighth horizontal sweep. Finally, the integrator 82 is caused to be zeroed by analog switch 90. The electron beam recorder now is enabled to record the next frame of data with the weave correction signal being added via the horizontal deflection amplifier 20 to the normal horizontal sweep of the beam 24, thus causing the frame of data to be horizontally shifted in position in response thereto.

Figure 5:
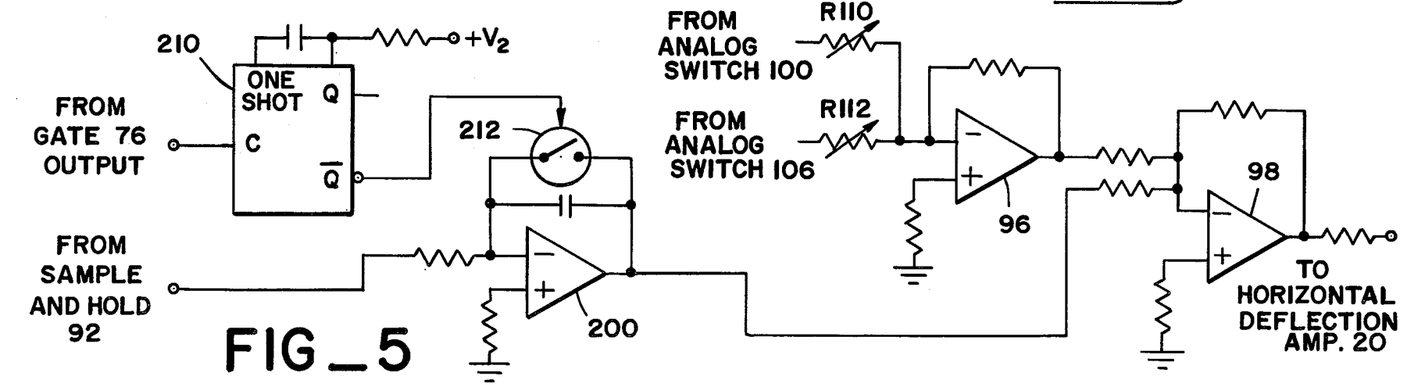
FIG. 5 is an alternate embodiment of the present invention detailing an added integrator means.

Since it is possible that over a long period of time the position of the sprocket hole could vary such that it is outside of the range within which the weave correction circuit is designed to correct, a second integrator may be added to the circuit 40 to correct such effects. This integrator would function as a means for keeping the position of the electron beam within the measurable area of the weave correction circuit 40, and would thus constitute supplemental centering means. An integrator circuit of this type is illustrated in FIG. 5. As can be seen, the output of the sample and hold unit 92 is coupled to the second integrator 200, a conventional operational amplifier hooked up in a manner similar to the integrator 82, except that integrator 200 is designed to have a much longer integration time. The output of integrator 200 is then added via amplifier 98, as mentioned above, to both the weave correction signal output of the filter means 94 during frame scanning, and to the output of the horizontal offset level means 102 during the edge measurement periods. Thus, this integrator 200 provides an overriding offset to the horizontal deflection amplifier 20 as a function of major long-term variations in the position of the sprocket hole 48 with respect to the film 26 edge. A one shot 210 is provided, having a long timeout time, to zero out the integrator 200 whenever, due to some error condition, no pulses are analyzed by the weave correction circuit 40 for an extended period of time. Again, an analog switch 212 is used, under the control of one shot 210, to zero the integrator 200. This is to protect against the integrator 200 continuing to integrate, and thereby incorrectly continuing to shift the horizontal deflection of the beam 24 farther out. FIG. 6C illustrates the output of the integrator 200 with respect to the output of sample and hold unit 92 and filter 94. The summing amplifier 98 sums the output of filter 94 with the integrator 200 output to obtain the modified weave correction signal. As can be seen from FIG. 6C, normally the integrator 200 has only a very slight effect on the horizontal deflection of the beam 24 over the short term. Note however that since there is no analog switch in series between integrator 200 and the horizontal deflection amplifier 20 that the integrator 200 output is always reflected in the horizontal position of the beam 24, no matter whether it is recording a frame of data or if a sprocket hole 48 edge measurement is being performed.

I claim:

1. The method of correcting film weave in a motion picture film recording or reproducing apparatus using a scanning device which employs a continuous motion film drive during scanning of the film over a plurality of frames of data comprising the steps of:
    (a) causing the scanning beam to horizontally cross the edge of a sprocket hole on said film;
    (b) detecting said beam as it crosses said sprocket hole edge and generating an edge crossing occurrence signal representative thereof;
    (c) comparing this edge crossing occurrence signal with a reference time;
    (d) generating a correction signal in response to the difference in time found in step (c) between said edge crossing time and said reference time;
    (e) coupling said correction signal to a horizontal sweep circuit such that all beam sweeps in a given frame are shifted in horizontal position as a function thereof; and
    (f) repeating of steps (a)–(e) for each frame scanned by said scanning device.

2. The method of correcting film weave in a motion picture film recording or reproducing apparatus using a scanning device which employs a continuous motion film drive during scanning of the film over a plurality of frames of data comprising the steps of:
    (a) causing the scanning beam to horizontally cross the edge of a sprocket hole on said film during each of a plurality of beam horizontal sweeps;
    (b) detecting said beam as it crosses said sprocket hole edge during each sweep and generating edge crossing occurrence signals representative thereof;
    (c) comparing each said edge crossing occurrence signal with a reference time;
    (d) averaging the time differences found in step (c);
    (e) generating a correction signal in response to said averaging of step (d);
    (f) coupling said correction signal to a horizontal sweep circuit such that all beam sweeps in a given frame are shifted in horizontal position as a function thereof; and
    (g) repeating of steps (a)–(f) for each frame scanned by said scanning device.

3. The method of correcting film weave in a film scanning device employing a continuous motion film drive during scanning of the film over a plurality of frames of data comprising the steps of:
    (a) shifting the sweep position of a plurality of horizontal sweeps of said beam, such that the beam crosses the edge of a sprocket hole on said film during each said sweep and such that beam position during such sweeps is independent of prior film weave correction signals;
    (b) detecting said beam as it crosses said sprocket hole edge during each sweep and generating edge crossing occurrence signals representative thereof;
    (c) generating a reference time pulse that is set to occur after the beam has crossed the edge of the sprocket hole during any said shifted sweep such that there is a positive time occurrence difference between each said edge crossing occurrence signal and the corresponding reference time pulse;
    (d) gating each said edge crossing occurrence signal with said reference time pulse such that an output pulse is generated whose pulse width is equal to the time difference found between each said edge crossing occurrence signal and said reference time pulse;
    (e) integrating the plurality of said output pulses such that an output level is generated whose amplitude is a function of the average of the pulse widths of said output pulses;

(f) updating a sample and hold means as a function of said output level;

(g) coupling the output of said sample and hold means as a film weave correction signal to a horizontal sweep circuit such that all beam sweeps in a given frame are shifted in horizontal position as a function thereof; and (h) repeating of steps (a) through (g) for each frame scanned by said scanning device.

4. The method of claim 3 wherein step (b) includes the steps of:

(i) detecting said beam as it crosses said sprocket hole edge and generating a beam signal in response thereto;

(ii) amplifying and base-line adjusting said detected beam signal;

(iii) squaring said amplified beam signal;

(iv) generating a window pulse during the time that a beam edge crossing is to occur; and (v) gating said squared and amplified beam signal with said window pulse to generate thereby an edge crossing occurrence signal representative of said beam edge crossing.

5. The method of claim 3 wherein step (d) includes the steps of:

(i) changing the state of a flip-flop as a function of the leading edge of each said edge crossing occurrence signal; and (ii) resetting said flip-flop with said reference time pulse after each said state change such that said flip-flop is caused to return to its original state, said flip-flop being caused thereby to output an output pulse for each edge crossing occurrence signal, whose pulse width is equal to the time during which said flip-flop was in its changed state.

6. The method of claim 3 wherein step (e) includes the steps of:

(i) inputting the plurality of said output pulses to an integrator;

(ii) inputting an offset signal to said integrator such that said offset signal normally keeps the level of integration of said output pulses within the operating range of said integrator; and (iii) outputting an output level from said integrator whose amplitude is the integrated average of the pulse widths of said output pulses less the integrated value generated from said offset signal.

7. The method of claim 3 additionally comprising the steps of:

(j) integrating the output of said sample and hold means such that a supplemental centering signal is generated thereby; and (k) coupling said centering signal to said horizontal sweep circuit, said centering signal being additionally combined with the output of said sample and hold means when beam sprocket hole edge sweeps are not being performed.

8. In a motion picture film recording or reproducing apparatus having a scanning beam and beam horizontal deflection means for scanning a film as said film is moved past a scanning area by means of a continuous motion film drive, a film weave correction circuit for varying the horizontal sweep position of said beam as a function of detected film position error comprising:

(a) means for enabling said beam to horizontally cross the edge of a sprocket hole defined on the film during at least one horizontal sweep of said beam, said means including means for disabling any prior generated film weave correction signal during such horizontal sweeps;

(b) detector means operatively positioned to detect said beam as the beam crosses the edge of said film sprocket hole and to output a beam edge crossing occurrence signal in response thereto;

(c) comparator means responsive to said beam edge crossing occurrence signal for comparing the time of occurrence of said detected beam edge crossing with a reference time; and (d) means responsive to said comparator means for generating a film weave correction signal, said signal being coupled to said horizontal deflection means.

9. The apparatus of claim 8 wherein said detector means comprises:

a beam detector operatively positioned such that said film is between said detector and said beam, and biased such that a beam signal is generated by said detector when said beam is incident thereon and not blocked by said film;

preamplifier means for amplifying said beam signal;

means for base line zeroing of said preamplifier means immediately prior to the expected occurrence of said beam edge crossing;

squaring means for generating a squared output signal as a function of said preamplified beam signal;

a window flip-flop operatively connected to turn on immediately prior to the expected occurrence of said beam edge crossing and operatively connected to turn off upon detection of a reference time pulse; and gating means enabled by the turned on state of said window flip-flop to allow said squared output signal to be coupled as a beam edge crossing occurrence signal to said comparator means.

10. The apparatus of claim 9 wherein said beam detector comprises an antenna and said scanning beam is an electron beam.

11. The apparatus of claim 8 wherein said comparator means comprises:

a pulse width flip-flop operatively connected to change state upon detecting said beam edge crossing occurrence signal, and operatively connected to reset upon detection of a reference time pulse, said flip-flop generating an output pulse whose pulse width is indicative of said sprocket hole edge position;

an integrator for integrating the time duration of said output pulse from said pulse width flip-flop, such that an output level is generated therefrom;

offset signal means operatively connected to said integrator such that as said integrator positively integrates the output of said pulse width flip-flop, said offset signal means continuously subtracts from said integration value generated by said integrator, such that the output level of said integrator remains within the operational limits of said integrator.

12. The apparatus of claim 11 wherein said means responsive to said comparator means for generating a film weave correction signal comprises:

a sample and hold means operatively enabled to be updated by said integrator output level when said integrator has completed integration of said plurality of beam signals; and filter means for filtering the output of said sample and hold means; said filter means output comprising said weave correction signal.

13. In a film scanning apparatus having a scanning beam and beam horizontal deflection means for scanning a film as said film is moved past a scanning area by means of a continuous motion film drive, said film including a plurality of sprocket holes defined thereon, a film weave correction circuit for varying the horizontal sweep position of said beam as a function of detected film position error comprising:
(a) means for enabling said beam to horizontally cross the edge of a sprocket hole adjacent to a frame currently being recorded, said means providing a plurality of such crossings per each sprocket hole;
(b) detector means operatively positioned to detect said beam as the beam crosses the edge of said sprocket hole during each said beam edge crossing, and to output a beam edge crossing occurrence signal in response to each said edge crossing;
(c) means for generating a reference time pulse a specific time during each said horizontal sweep by said beam of said sprocket hole;
(d) a pulse width flip-flop operatively connected to change state and go on upon detecting each said beam edge crossing occurrence signal, and operatively connected to be reset and go off upon detection of said reference time pulse, said flip-flop generating output pulses thereby whose pulse widths are indicative of said sprocket hole edge position;
(e) an integrator for integrating the time duration of each of said plurality of output pulses from said pulse width flip-flop, generated from said plurality of beam horizontal edge crossings of said sprocket hole, such that an output level is generated therefrom which represents the average pulse width of said output pulses;
(f) offset signal means operatively connected to said integrator such that as said integrator positively integrates the output pulses from said pulse width flip-flop, said offset signal means continuously subtracts a fixed amount from said integration value generated by said integrator, such that the output level of said integrator remains within the operational limits of said integrator; and
(g) sample and hold means operatively enabled to be updated by said integrator output level when said integrator has completed integration of said plurality of beam edge crossing signals, said sample and hold means outputting a weave correction signal thereby, said signal being coupled to said horizontal deflection means.

14. The apparatus of claim 13 further comprising second integrator means operatively connected to continuously integrate the output of said sample and hold means and to generate a supplemental centering signal in response thereto; and means for coupling said centering signal to said horizontal deflection means, said means including means for additively combining said centering signal with the output of said sample and hold means when beam sprocket hole edge sweeps are not being performed.

* * * * *